July 26, 1927.
F. E. HEATH
1,637,303
OVEN GRATE
Filed Jan. 27, 1927
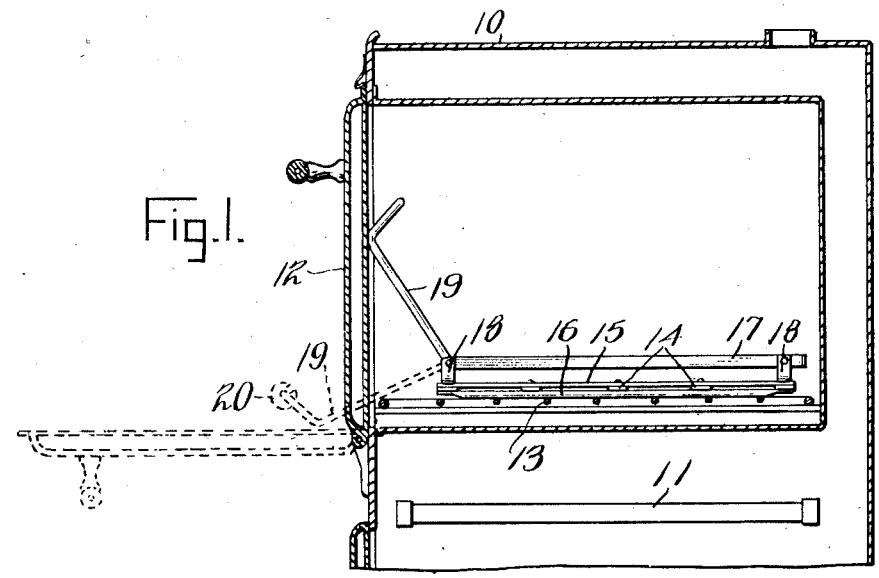
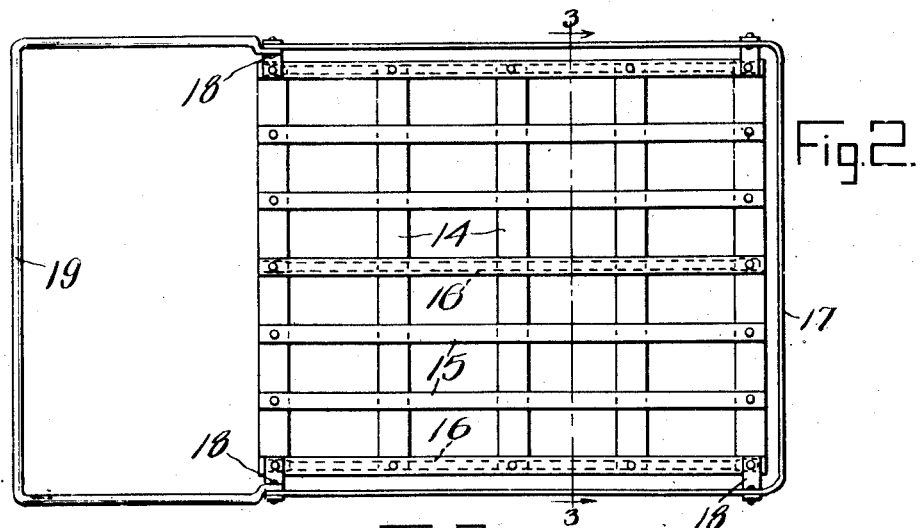
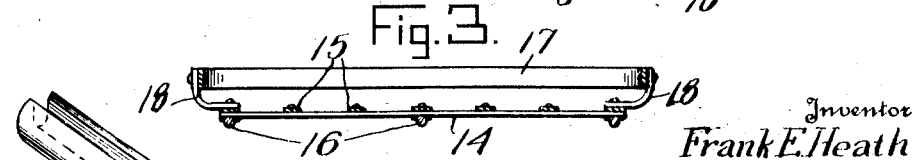
Inventor
Frank E. Heath
Attorney Patented July 26, 1927.

1,637,303

UNITED STATES PATENT OFFICE.

FRANK E. HEATH, OF SHERMAN MILLS, MAINE.

OVEN GRATE.

Application filed January 27, 1927. Serial No. 164,043.

My said invention relates to an oven grate or framework adapted to be inserted in an oven for supporting cooking utensils or receptacles containing food to be cooked and being provided with a handle by which it may be withdrawn, such grate being particularly designed for use with ovens having drop doors against which the handle of the grate is adapted to rest so that when the oven door is opened the handle of the grate will drop down by gravity to a position where it may be readily grasped and the grate with its load pulled out upon the oven door.

The object of my invention is to provide an oven grate by means of which hot cooking utensils or the like may be easily removed from an oven without burning the hands.

Referring to the accompanying drawings which are made a part hereof and on which similar reference characters indicate similar parts, Figure 1 is a vertical section through an oven illustrating the application of my invention, Figure 2, a top plan view of my oven grate, Figure 3, a section on the line 3—3 of Figure 2, and Figure 4, a perspective of a detachable handle grip which may be used with my device.

In the drawings reference character 10 indicates an oven of conventional construction having a burner 11, drop door 12, and adjustable rack or basket 13 for supporting pots, pans and the like containing food to be cooked.

A frame or grating is provided consisting of cross bars 14 and longitudinal bars 15 supported by shoes or skids 16 which engage the bottom of the oven or adjustable rack upon which the device may be supported and form runners the ends of the shoes 16 being preferably tapered as shown in Figure 1 in order to cause the device to slide freely over the support upon which it is mounted. A retaining bar or upstanding guard rail 17 extends around the sides and rear end of the frame spaced slightly above the same and such retaining bar is supported by curved or substantially L-shaped brackets 18, one of which is disposed at each corner of the frame.

The open end of the frame is provided with a handle 19 which has one end pivoted to each end of the bar 17. This open end of the frame permits cooking utensils to be easily slipped into and out of such frame without burning the hands. The forward portion of the handle 19 is preferably bent upwardly at a slight angle so that it may rest against the oven door in substantially parallel relation and be held elevated, as shown in Figure 1, until the door is opened when it will drop by gravity to a position to be readily grasped and the grate pulled out upon the oven door the extremities of the bar or handle 19 are slightly offset adjacent their points of pivotal connection with the extremities of the guard rail 17 to prevent the handle from falling rearwardly upon the body of the device so that it cannot be readily engaged.

In Figure 4 is shown a detachable handle or hand grip 20 which may be formed of wood or other inexpensive heat insulating material and by means of which the handle may be engaged for pulling the grate out of the oven. If desired in lieu of the detachable handle or hand grip the handle 19 may be engaged by some grappling device such as a hook or the like.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. A rack or basket for supporting cooking utensils and the like in an oven comprising a framework, an upstanding retaining bar or guard rail on the sides and inner end of said framework for preventing cooking utensils and the like from sliding off the same and open at the front end to permit objects to be slid on and off the same, and a handle pivotally mounted at said open end and arranged to be held upright by an oven door when the same is in closed position but adapted when the door is opened to drop by gravity to a free substantially horizontal position where it may be readily engaged for removing the device from an oven, substantially as set forth.

2. A rack or basket for supporting cooking utensils and the like in an oven comprising a framework formed of longitudinally and transversely extending members, an upstanding retaining bar or guard rail extending around one end and the sides of said framework, one end of said framework being unobstructed by said guard whereby objects may be readily placed upon and removed from the device, spaced longitudinally disposed supporting runners on the under side of said framework, and a handle having its ends pivotally connected to the extremities of said guard rail and swingable from an elevated position forwardly to a substantially horizontal position, substantially as set forth.

In witness whereof, I have hereunto set my hand and seal at Sherman Mills, Maine, this 22d day of January, A. D. nineteen hundred and twenty-seven.

FRANK E. HEATH. [L. S.]